(12) United States Patent
Kim

(10) Patent No.: US 8,533,897 B2
(45) Date of Patent: Sep. 17, 2013

(54) WIPER BLADE

(75) Inventor: In-Kyu Kim, Ansan-si (KR)

(73) Assignees: ADM21 Co., Ltd., Ansan-si (KR); In-Kyu Kim, Ansan-si (KR)

( * ) Notice: Subject to any disclaimer, the term of this patent is extended or adjusted under 35 U.S.C. 154(b) by 192 days.

(21) Appl. No.: 13/130,925

(22) PCT Filed: Nov. 26, 2009

(86) PCT No.: PCT/KR2009/007020
§ 371 (c)(1),
(2), (4) Date: May 24, 2011

(87) PCT Pub. No.: WO2010/062125
PCT Pub. Date: Jun. 3, 2010

(65) Prior Publication Data
US 2011/0225761 A1 Sep. 22, 2011

(30) Foreign Application Priority Data

Nov. 26, 2008 (KR) ........................ 10-2008-0118405

(51) Int. Cl.
*B60S 1/40* (2006.01)
(52) U.S. Cl.
USPC ............... 15/250.201; 15/250.43; 15/250.451
(58) Field of Classification Search
USPC ........... 15/250.201, 250.32, 250.361, 250.43, 15/250.44, 250.451–250.48
See application file for complete search history.

(56) References Cited

U.S. PATENT DOCUMENTS 3,088,155 A 5/1963 Smithers
(Continued)

FOREIGN PATENT DOCUMENTS

CA 2617013 A1 * 11/2008
CN 1380865 A 11/2002
(Continued)

OTHER PUBLICATIONS

Chinese Patent Office, Chinese Office Action issued in corresponding CN Application No. 200980147147.0, dated Jan. 14, 2013.

*Primary Examiner* — Mark Spisich
*Assistant Examiner* — Andrew A Horton
(74) *Attorney, Agent, or Firm* — Sughrue Mion, PLLC

(57) ABSTRACT

The present invention generally relates to a wiper blade for wiping a windshield, and more particularly to wiper blade including a spoiler that forms an air flow allowing the wiper blade to be in close contact with the windshield. The wiper blade according to the present invention has a frame, a spoiler receiving the frame therein and forming an upper surface of the wiper blade and a wiper lip extending downwardly from the frame to contact a windshield. The wiper blade includes the following: a frame including an adaptor coupler at a midway portion; a spoiler receiving the frame and provided next to either side of the adaptor coupler, the spoiler having a cross-section including leg sides of a front surface and a rear surface and a topside of a top surface; and an adaptor mounted to the adaptor coupler and connecting the frame to a wiper arm. A width of the top surface connecting the front surface and the rear surface of the spoiler is maximal near the adaptor coupler and becomes narrower toward a longitudinal end of the spoiler.

10 Claims, 15 Drawing Sheets

(56) References Cited

U.S. PATENT DOCUMENTS

| | | |
|---|---|---|
| 4,976,001 A | 12/1990 | Wright |
| 6,810,556 B1 | 11/2004 | Kotlarski |
| 6,944,905 B2 | 9/2005 | De Block et al. |
| 2006/0064841 A1* | 3/2006 | Nakano ................ 15/250.201 |
| 2006/0207050 A1* | 9/2006 | Shanmugham et al. ... 15/250.43 |
| 2007/0113367 A1* | 5/2007 | Boland et al. ............ 15/250.201 |
| 2007/0204422 A1 | 9/2007 | Machida et al. |
| 2008/0289133 A1 | 11/2008 | Kim |

FOREIGN PATENT DOCUMENTS

| | | |
|---|---|---|
| CN | 2820628 Y | 9/2006 |
| CN | 101311043 A | 11/2008 |
| JP | 07-179165 A | 7/1995 |
| JP | 2007-118621 A | 5/2007 |
| KR | 10-0676957 B1 | 2/2007 |
| KR | 10-2007-0100605 A | 10/2007 |
| KR | 10-2008-0102564 A | 11/2008 |
| KR | 10-0988456 B1 | 10/2010 |

* cited by examiner

WIPER BLADE

TECHNICAL FIELD

The present invention generally relates to a wiper blade for wiping a windshield, and more particularly to a wiper blade having a spoiler that can minimize aerodynamic forces applied to the wiper blade while a vehicle is traveling.

BACKGROUND OF THE INVENTION

Generally, wiper blades are used to remove rainwater falling on a windshield of a car to ensure clear visibility. Further, wiper blades are also used to wipe off dirt stuck on the car windshield. Recently, there has been introduced in the art a wiper blade including a straight frame and a spoiler attached to the frame. The spoiler is designed to reduce resistance applied to the wiper blade while the car is traveling.

Explanation will be made hereinafter as to one example of prior art wiper blades with reference to FIGS. 1 and 2.

FIG. 1 is a perspective view showing a prior art wiper blade. FIG. 2 is a sectional view taken along the line A-A of the wiper blade shown in FIG. 1.

As shown in FIGS. 1 and 2, the prior art wiper blade includes the following: an adapter 10 for coupling to a wiper arm; a straight frame 30 joined with the adaptor; a spoiler 20 located on the frame 30; a wiper lip 40 coupled to the frame 30 and extending downwardly from the frame 30; and a tip clamp 50 for clamping ends of the spoiler 20 and the frame 30.

The frame 30 includes an elongated metallic plate. The spoiler 20 has an approximately triangular cross-section with an open bottom side, wherein the frame 30 can be fitted to the bottom side. A slit 34 for fixing the wiper lip 40 is formed at a midway portion of the frame 30 in a longitudinal direction of the frame. The wiper lip 40 includes a head 41, a body 42 and a contactor 43. The head is fitted to the spoiler 20 through the slit 34 of the frame 30 and fixed to the frame 30. The body 42 is caught on the lower portion of the frame 30. The contactor contacts a windshield.

FIG. 3 is a perspective view showing when the spoiler of the prior art wiper blade is placed on a windshield. FIG. 4 shows simulations on the air flows passing by the spoiler when the spoiler of the wiper blade is placed as shown in FIG. 3 and a vehicle travels at a velocity of 100 km/h. In FIG. 4, an a area shows that the flow velocity of the air is equal to or more than 290 km/h, a b area shows that the flow velocity of the air is less than 290 km/h and equal to or more than 230 km/h, a c area shows that the flow velocity of the air is less than 230 km/h and equal to or more than 170 km/h, and a d area shows that the flow velocity of the air is less than 170 km/h and equal to or more than 110 km/h.

As shown in FIG. 3, the windshield 1 is inclined relative to the horizontal plane (i.e., X-Z plane). The flow velocity of the air flowing horizontally increases as the air flows along the vehicle. Further, the flow velocity of the air increases more as the air flows along the inclined windshield. Such an increase in the flow velocity of the air may be explained with a Venturi effect based on Bernoulli's Principle or a Kutta Condition (Coanda Effect). The air flow flowing along the surface of the vehicle was simulated using a finite element program. When the spoiler 20 of the wiper blade is placed on the windshield as shown in FIG. 3 and the vehicle travels at a velocity of 100 km/h, the air flow flowing along the surface of the vehicle is as shown in FIG. 4.

According to the simulation results shown in FIG. 4, when the vehicle equipped with the spoiler 20 of the prior art wiper blade travels at a velocity of 100 km/h, the velocity of the air, which horizontally proceeds from the front of the vehicle, gradually increases up to 170 km/h as the air passes by the surface of the vehicle. Further, the flow velocity of the air sharply increases as the air passes by the spoiler 20. Furthermore, the air flows by an end of the windshield 1 at a velocity of 300 km/h or more and then flows by a roof of the vehicle at a velocity of 320 km/h or more.

Table 1 provided below shows the values of the aerodynamic forces acting on the spoiler 20 depending upon the aforesaid air flows.

TABLE 1

|  | Unit | Value | Average value | Minimum value | Maximum value |
| --- | --- | --- | --- | --- | --- |
| Resultant force | [N] | 40.52465158 | 40.3412 | 40.0847 | 40.5247 |
| X-directional force | [N] | 0.018093413 | 0.0180534 | 0.0179921 | 0.018105 |
| Y-directional force | [N] | −13.78663257 | −13.7255 | −13.7866 | −13.6399 |
| Z-directional force | [N] | −38.10742475 | −37.9344 | −38.1074 | −37.6927 |

According to Table 1, when the vehicle travels at 100 km/h, a rearward force of 38.1N is generated in the wiper blade in a horizontal direction (negative Z-direction) and a downward force of 13.7N is generated in the wiper blade in a vertical direction (negative Y-direction). An aerodynamic force in a longitudinal direction (X-direction) approximates to nearly zero. A resultant aerodynamic force from a resultant force of those aerodynamic forces comes to about 40.52N. The above-mentioned increase in the aerodynamic forces may apply a great force to the arm to which the wiper blade is attached. The large aerodynamic force is problematic since it causes a fatigue load and the deformation of the wiper blade while the vehicle is traveling and deteriorates the durability of the arm.

Further, the large aerodynamic force is also problematic since it can deform the spoiler of the wiper blade, which is composed of an elastic material and has an empty inside space, while the vehicle is traveling.

Furthermore, the large aerodynamic force during traveling of the vehicle may change the shape of the spoiler. If the shape of the spoiler is not maintained, then the aerodynamic characteristics change, and thus, the aerodynamic forces applied to the wiper blade can vary. This may cause the wiper blade to conduct irregular wiping operations.

SUMMARY OF THE INVENTION

The present invention is directed to solving the aforementioned problems. It is an object of the present invention to provide a wiper blade, wherein a width of a top surface of a spoiler varies in a longitudinal direction to allow the air flow in a midway portion of the wiper blade to smoothly pass by the spoiler on the wiper blade in the longitudinal direction of the spoiler. This is to reduce aerodynamic forces applied to the wiper blade and improve durability of the wiper blade.

It is a further object of the present invention to provide a wiper blade, which includes a plurality of reinforcing members arranged in the spoiler to prevent undesirable shape change and bending deformation of the spoiler. This is to ensure that the shape of the spoiler is maintained uniformly.

It is another object of the present invention to provide a wiper blade wherein the reinforcing member includes a head seat shaped to correspond to a shape of a head of the wiper lip to firmly attach a wiper lip to a frame. This is to improve wipe performance upon a windshield.

To achieve the foregoing object, the present invention provides a wiper blade having a frame, a spoiler receiving the frame therein and disposed on the frame and a wiper lip extending downwardly from the frame to contact a windshield. The wiper blade includes the following: a frame including an adaptor coupler in a midway portion; two spoilers receiving the frame and provided next to either side of the adaptor coupler, the spoiler having a trapezoidal cross section including leg sides of a front surface and a rear surface and a topside of a top surface; and an adaptor mounted to the adaptor coupler and connecting the frame to a wiper arm. A width of the top surface of the spoiler is maximal near the adaptor coupler and becomes narrower toward both ends of the spoiler.

It is preferred that the front and rear surfaces have a curved cross section that is concave inwardly. It is also preferred that the top surface includes a curved surface that is concave relative to a front of the spoiler.

Further, the spoiler preferably includes a pair of guide couplers extending inwardly and formed in a lower front end and a lower rear end of the spoiler and the frame is seated in the guide couplers and thus received in the spoiler. The guide couplers may extend inwardly from either the front end or the rear end of the spoiler while forming an acute angle relative to a horizontal plane.

The frame may include a locking groove, which is formed by cutting out the frame, in the vicinity of the longitudinal end. The spoiler may include a locking protrusion that is fitted to the locking groove when assembling the frame and the spoiler.

The spoiler may include a plurality of reinforcing members or ribs in a longitudinal direction.

It is preferred that the frame includes a slit formed in a longitudinal direction at a midway portion. It is also preferred that the wiper lip includes a head inserted to the spoiler through the slit and having a width wider than the slit. Further, the reinforcing member preferably includes a head seat having a shape corresponding to the head at a lower end such that the head is seated to the head seat in close contact therewith.

The head may include a convex protrusion and the head seat may include a concave groove formed to correspond to the head. The head may include a protrusion protruding upwardly and the head seat may include a groove configured to closely contact the head and the protrusion. It is preferred that the protrusion of the head is formed obliquely with respect to the frame.

The reinforcing member may include a flat plate provided in the spoiler and having a shape of the cross section of the spoiler or may include a reinforcing frame formed on an inner surface of the spoiler. When the reinforcing member includes the reinforcing frame, the reinforcing frame includes a vertical reinforcing frame extending downwardly from the top surface of the spoiler and a horizontal reinforcing frame extending from either the front end or the rear end of the spoiler toward a center of the spoiler.

According to the present invention, it is possible to reduce the flow velocity of the air flowing along the surface of the spoiler of the wiper blade and to reduce the aerodynamic forces from the air passing by the spoiler.

Further, according to the present invention, a plurality of reinforcing members formed in the longitudinal direction in the spoiler can reduce the deformation of the spoiler and constantly maintain the aerodynamic characteristics of the spoiler.

Furthermore, according to the present invention, since the head seat shaped to correspond to the head of the wiper lip is formed in the reinforcing members of the spoiler, the head of the wiper lip can be fixed to the head seat in close contact therewith.

Moreover, according to the present invention, since the locking groove for coupling to the frame is formed in the either end of the spoiler, the spoiler can be easily assembled to the frame without using a separate fastening part.

DETAILED DESCRIPTION OF THE INVENTION

One embodiment of a wiper blade according to the present invention will be described in detail with reference to FIGS. 5 to 15.

Figure 1:
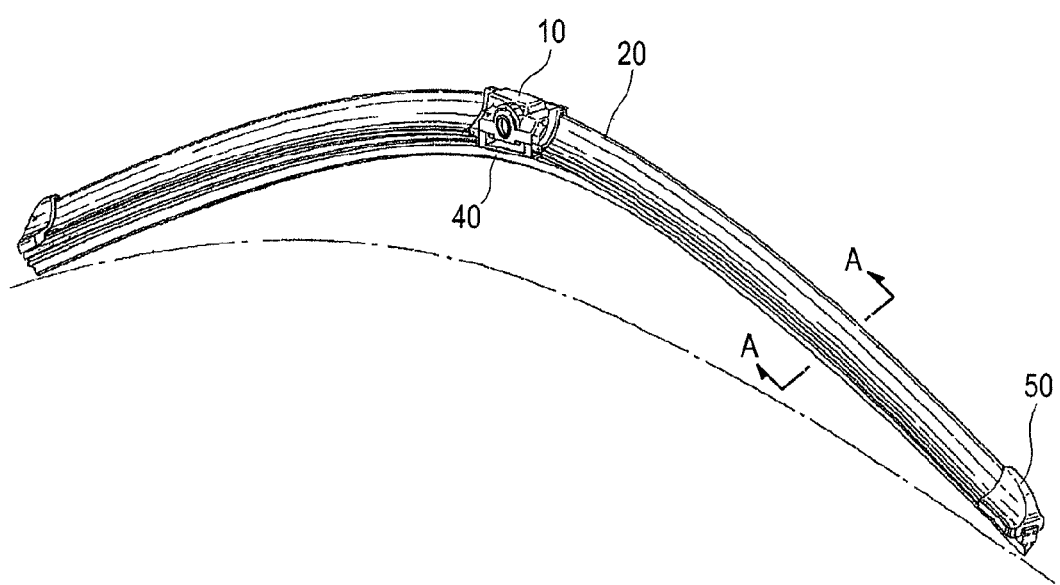
FIG. 1 is a perspective view showing a prior art wiper blade.
Figure 2:
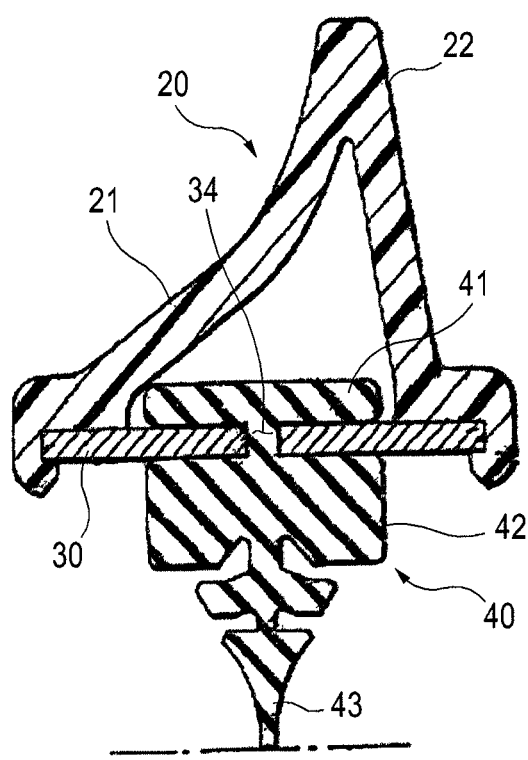
FIG. 2 is a sectional view taken along the line A-A of the wiper blade shown in FIG. 1.
Figure 3:
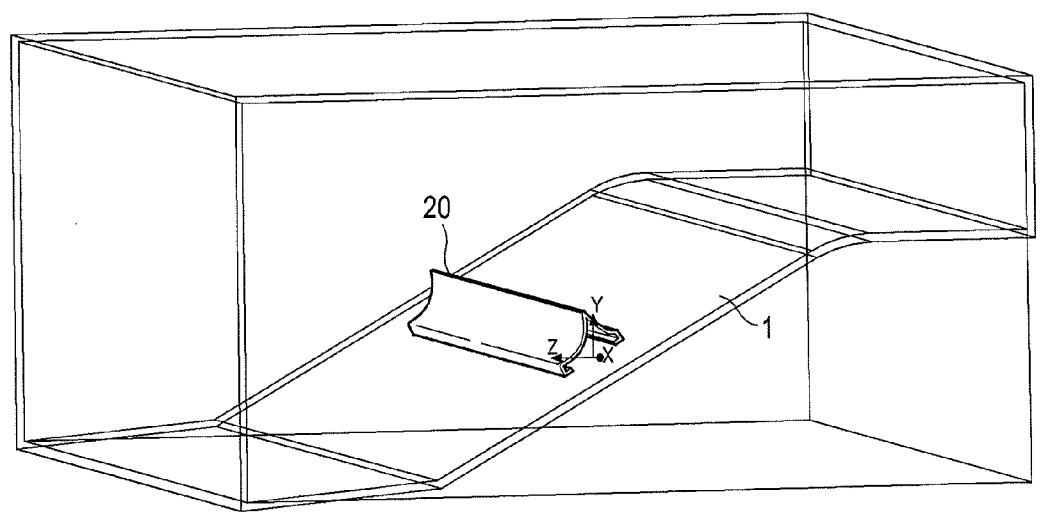
FIG. 3 is a perspective view showing that a spoiler is placed on a windshield for simulation on aerodynamic characteristics of the spoiler of the prior art wiper blade.
Figure 4:
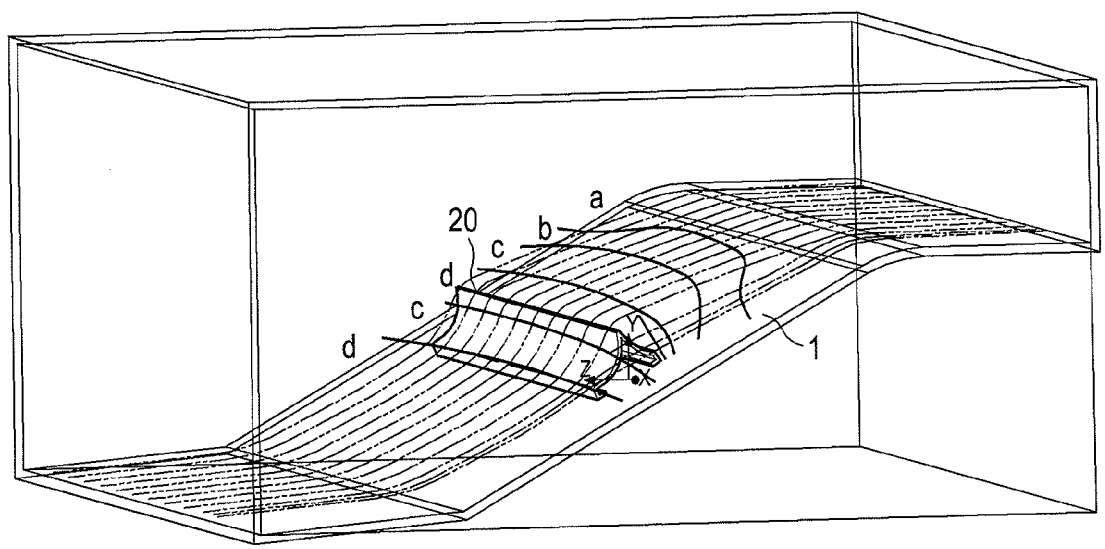
FIG. 4 is a perspective view showing simulation results of the air flows around the spoiler when the spoiler is placed as shown in FIG. 3 and a vehicle travels at a velocity of 100 km/h.

In the specification and drawings, a coordinate is explained with reference to the same X-axis, Y-axis and Z-axis as those shown in FIG. 3 depicting a prior art. In the specification, a longitudinal direction of a spoiler means a direction facing from an adaptor coupler toward one end. Further, a frontward and rearward direction of a spoiler means a direction facing from a front surface of a spoiler toward a rear surface of the spoiler.

Figure 5:
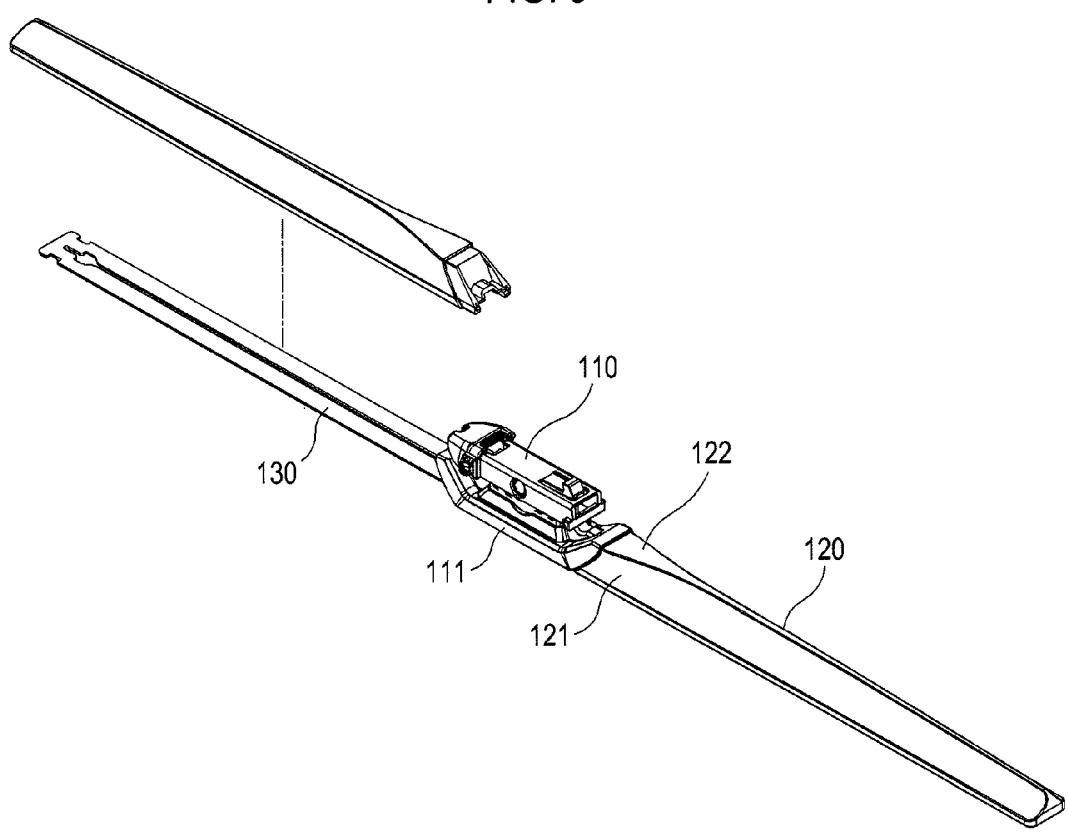
FIG. 5 is a perspective view showing a wiper blade according to the present invention.
Figure 6:
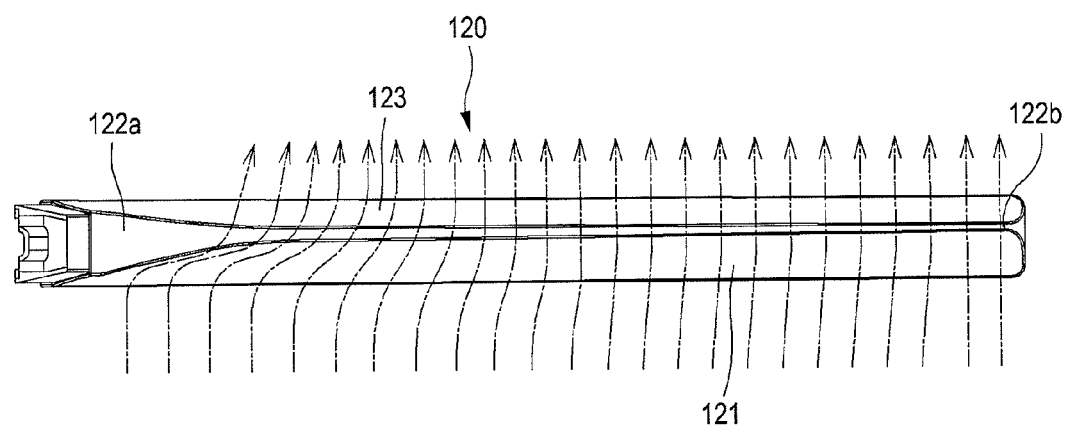
FIG. 6 is a plan view schematically showing air flows around a spoiler of the wiper blade shown in FIG. 5.

FIG. 5 is a perspective view showing a wiper blade according to the present invention. FIG. 6 is a plan view showing a spoiler of the wiper blade shown in FIG. 3.

As shown in FIG. 5, the wiper blade according to the present invention includes the following: a frame 130 including an adaptor coupler 111 at a midway portion thereof; a spoiler 120 receiving the frame 130 and provided next to either side of the adaptor coupler 111, the spoiler 120 having a trapezoidal cross-section including leg sides of a front surface 121 and a rear surface (123 in FIG. 6) and a topside of a top surface 122; and an adaptor 110 mounted on the adaptor coupler 111 in the midway portion of the frame 130 and connecting the frame to a drive arm (not shown). A width of the top surface 122 of the spoiler 120 is maximal in the vicinity of a first end (122a in FIG. 6) located in the midway portion of the wiper blade and becomes narrower toward a second end (122b in FIG. 6) of the spoiler 120 located in either end of the wiper blade.

The front surface 121 and the rear surface 123 of the spoiler 120 include a curved surface that is inwardly concave when viewed from the side. The width of the top surface 122 of the spoiler 120 becomes narrower from the first end 122a toward the second end 122b while being concave with respect to a front of the spoiler 120.

Figure 8:
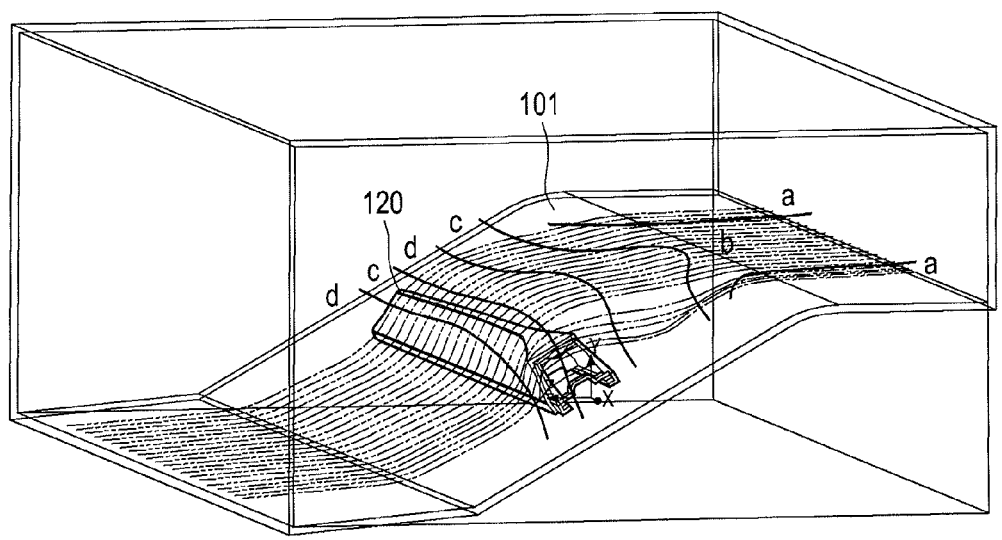
FIG. 8 is a perspective view showing simulation results of the air flows around the spoiler when the spoiler is placed as shown in FIG. 7 and a vehicle travels at a velocity of 100 km/h.

FIG. 6 is a plan view schematically showing air flows, which flow in from the front and then pass by the spoiler 120. As shown in FIG. 6, the flow of the air, which flows in to the front surface 121 of the spoiler 120, flows under the longitudinal width variation of the top surface 122 such that it is directed from the first end 122a of the wiper blade toward the second end 122b of the wiper blade. That is, as shown by the arrows, the air flow curves toward the end of the spoiler 120. Such a change in flow direction of the air flow is greatest at the first end 122a of the top surface 122, while it is smallest at the second end 122b of the top surface 122. FIG. 8 shows the results of simulating the flow of the air flowing on the spoiler along with the above-described flow by means of a program using a finite element method.

Figure 7:
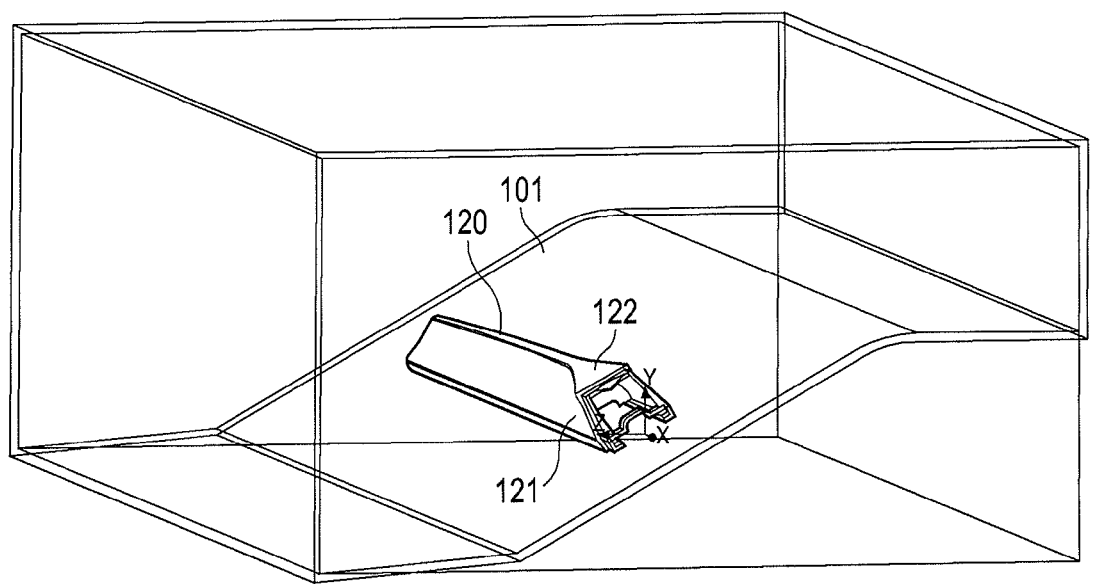
FIG. 7 is a perspective view showing when the spoiler of the wiper blade is placed on a windshield for simulation of aerodynamic characteristics of the wiper blade according to the present invention.

FIG. 7 is a perspective view showing when the spoiler is placed on a windshield for simulation of aerodynamic characteristics of the spoiler shown in FIG. 6. FIG. 8 shows the simulation result for the air flow passing by the spoiler when the spoiler is placed as shown in FIG. 7 and a vehicle travels at a velocity of 100 km/h.

When the vehicle travels at a velocity of 100 km/h with the spoiler 120 placed on the windshield as shown in FIG. 7, the air flow flowing on the surface of the vehicle shows a velocity distribution shown in FIG. 8. In FIG. 8, an a area shows that the flow velocity of the air is equal to or more than 290 km/h, a b area shows that the flow velocity of the air is less than 290 km/h and equal to or more than 230 km/h, a c area shows that the flow velocity of the air is less than 230 km/h and equal to or more than 170 km/h and a d area shows that the flow velocity of the air is less than 170 km/h and equal to or more than 110 km/h.

As shown in FIG. 8, when the vehicle equipped with the wiper blade according to the present invention travels at 100 km/h, the flow velocity of the air, which proceeds horizontally from the front of the vehicle, gradually increases up to 170 km/h while passing by the surface of the vehicle. Since the front surface of the spoiler 120 causes resistance while the air passes by the spoiler 120, the increase in the flow velocity of the air is reduced. The shapes of the front surface 121 and the top surface 122 of the spoiler 120 make the air flow directed toward the second end 122b. The flow velocity of the air increases again after passing by the spoiler 120. Thus, the air flows out at end of the windshield 1 at a velocity of about 230 km/h or less and flows out on a roof of the vehicle at a velocity of about 260 km/h. Comparing the aforesaid simulation result with the flow velocity of the air passing by the spoiler of the prior art wiper blade, it can be understood that the flow velocity of the air passing by the spoiler according to this embodiment is significantly decreased.

Table 2 provided below shows the values of the aerodynamic forces generated in the spoiler 120 of the wiper blade according to the aforesaid aerodynamic characteristics when a vehicle travels at 100 km/h.

TABLE 2

|  | Unit | Value | Average value | Minimum value | Maximum value |
| --- | --- | --- | --- | --- | --- |
| Resultant force | [N] | 20.36274367 | 20.2312 | 20.1474 | 20.3627 |
| X-directional force | [N] | 0.445785976 | 0.444046 | 0.441793 | 0.449054 |
| Y-directional force | [N] | −3.064974406 | −3.05755 | −3.09562 | −3.04224 |
| Z-directional force | [N] | −20.12581767 | −19.9939 | −20.1258 | −19.9115 |

As can be seen from Table 2, a rearward force of about 20.126N in a horizontal direction and a downward force of 3.065N in a vertical direction are generated in the spoiler 120 of the wiper blade by the air flow when the vehicle travels at 100 km/h. Further, as to the aerodynamic force in the longitudinal direction, the aerodynamic force of about 0.45N is generated toward the first end 122a of the spoiler 120. The aerodynamic force in the longitudinal direction (X-directional aerodynamic force) is increased compared to the aerodynamic force acting on the spoiler of the prior art wiper blade. However, this is very small when compared with the aerodynamic forces in other directions. Thus, the increase in the aerodynamic force of the spoiler 20 in the longitudinal direction would scarcely affect the performance deterioration of the wiper blade.

The resultant force from each aerodynamic force is about 20.36N. This means that about a half of the resultant force acting on the prior art spoiler acts on the spoiler when considering the same running velocity. Thus, the decrease in the aerodynamic forces may lead to the reduction in a fatigue load and deformation of the wiper blade as well as the improved durability of the arm.

Figure 9:
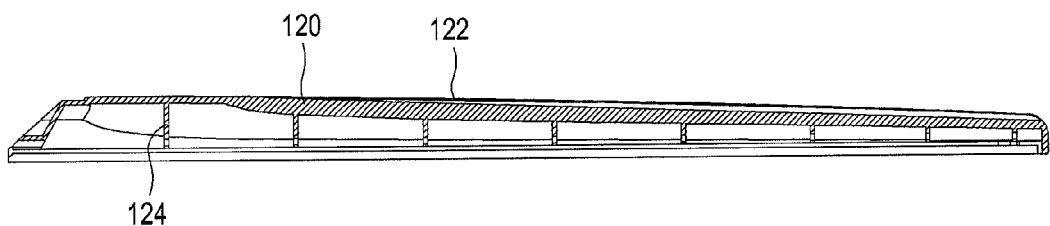
FIG. 9 is a longitudinally-sectional view showing the spoiler of the wiper blade according to the present invention.

FIG. 9 is a longitudinally-sectional view of the spoiler of the wiper blade according to the present invention. FIGS. 10 to 13 are cross-sectional views showing reinforcing members that are arranged in the longitudinal direction of the spoiler in the spoiler of the wiper blade according to the present invention.

As shown in FIG. 9, in one embodiment, a plurality of reinforcing members 124 are formed inside the spoiler 120 in the longitudinal direction of the spoiler. The reinforcing member 124 serves to bear the bending or flexure of the spoiler 120 to thereby reduce the deformation of the spoiler 120. Further, the reinforcing member 124 helps to uniformly maintain the sectional shape of the spoiler 120.

Figure 10:
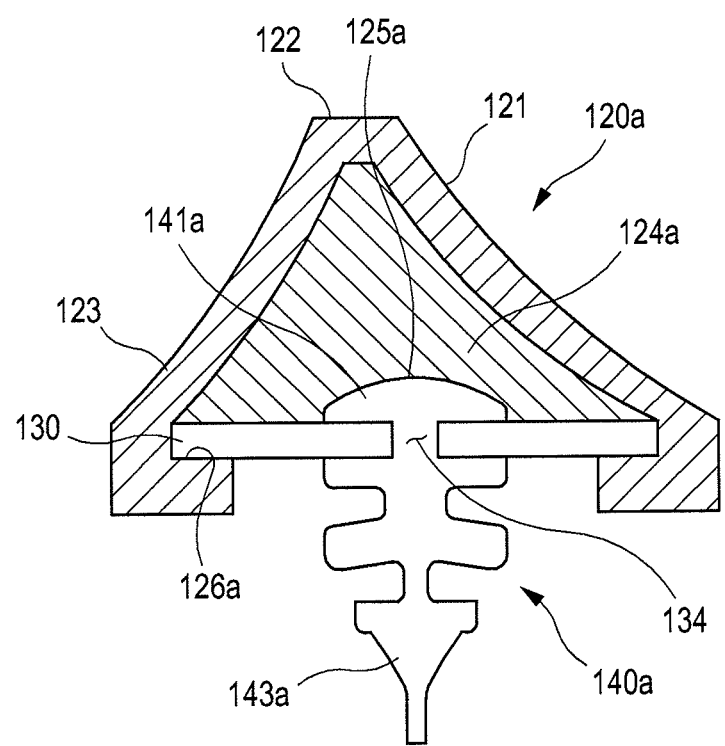
FIGS. 10 to 13 are cross-sectional views showing several embodiments of reinforcing members arranged in a longitudinal direction in the spoiler of the wiper blade according to the present invention.

FIG. 10 is a cross-sectional view showing a first embodiment of the reinforcing member provided in the spoiler. A reinforcing member 124a shown in FIG. 10 includes a flat plate formed inside a spoiler 120a.

Guide couplers 126a that extend inwardly from either a front lower end or a rear lower end of the spoiler 120 are formed in the spoiler to be coupled to the frame 130. When coupled, an upper surface of the frame 130 is placed in contact with a lower end of the reinforcing member 124a and lower front and rear ends of the frame 130 are coupled to the guide couplers 126a.

A head 141a of the wiper lip 140a has a convex cross section. The reinforcing member 124a includes a head seat 125a, which is concavely formed to correspond to the head 141a of the wiper lip 140a, at its lower midway end. The head 141a of the wiper lip 140a is fitted through a slit 134 of the frame 130 and is then firmly seated and fixed to the head seat 125a. This provides a fixed position of the wiper lip 140a and an improved performance of wiping a windshield.

Figure 11:
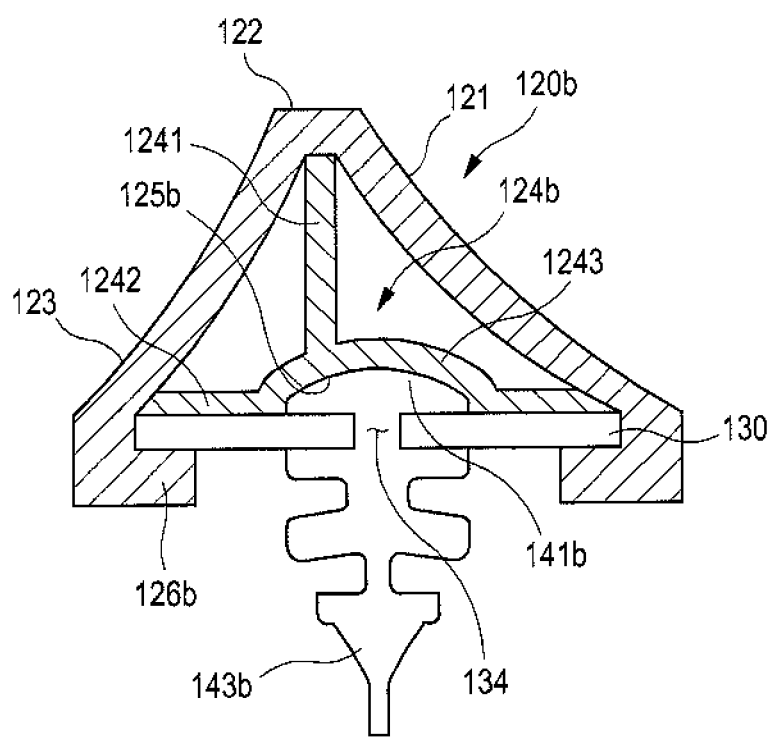

FIG. 11 is a cross-sectional view showing a second embodiment of the reinforcing member provided in the spoiler. A reinforcing member 124b shown in FIG. 11 includes a reinforcing frame that is formed inside a spoiler 120b. The reinforcing member 124b includes a vertical reinforcing frame 1241 extending downwardly from a top of the spoiler 120 and a horizontal reinforcing frame 1242 extending from front and rear ends of the spoiler 120b toward a center of the spoiler.

Coupling guides 126b that extend inwardly from either a front lower end or a rear lower end of the spoiler 120b are formed in the spoiler to be coupled to the frame 130. When coupled, the upper surface of the frame 130 is placed in contact with a lower end of the horizontal reinforcing frame 1242 and the lower front and rear ends of the frame 130 are placed in contact with lower surfaces of the guide couplers 126b.

A head 141b of the wiper lip 140b has a convex cross-section. The reinforcing member 124b includes a central reinforcing frame 1243, which is concavely formed to correspond to the head 141b of the wiper lip 140b, at a midway portion of the horizontal reinforcing frame 1242. A head seat 125b is formed in a lower end of the central reinforcing frame 1243. The head 141b of the wiper lip 140b is fixed in such a manner that an upper surface thereof is seated to the head seat 125b of the reinforcing member 124b and a lower surface thereof is placed on the frame 130.

Figure 12:
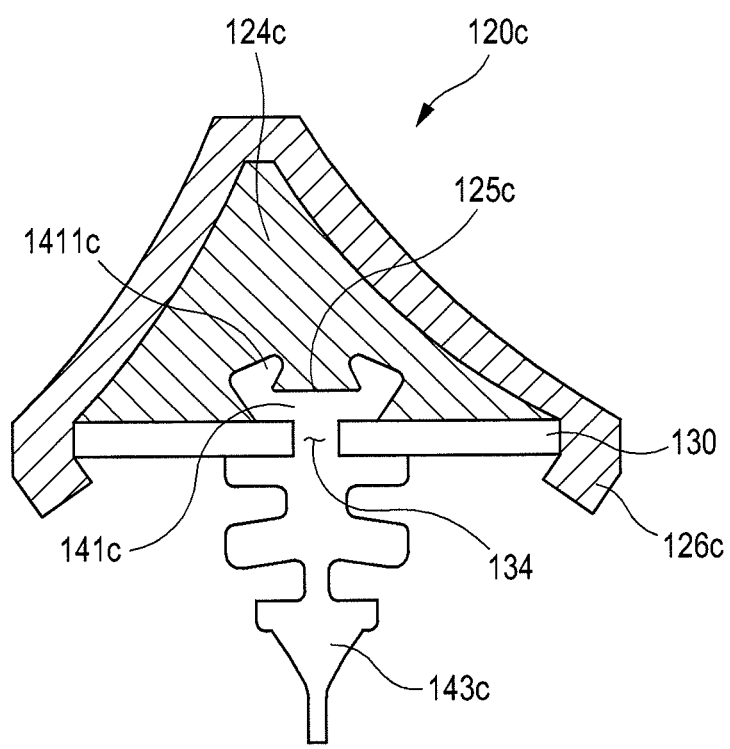

FIG. 12 is a cross-sectional view showing a third embodiment of the reinforcing member provided in the spoiler. The reinforcing member 124c shown in FIG. 12 is similar to the reinforcing member shown in FIG. 10. However, they are different in terms of the shapes of the following parts: guide couplers 126c for coupling to the frame 130; a head 141c of the wiper lip 140c; and a portion of the reinforcing member for seating the head thereto.

A U-shaped protrusion 1411c protrudes from the head 141c of the wiper lip 140c. The head seat 125c corresponding to the shapes of the protrusion 1411c and the head 141c is formed at a midway lower end of the reinforcing member 124c. The head 141c of the wiper lip 140c engages and is firmly fixed to the head seat 125c of the reinforcing member 124c. The protrusion 1411c of the head 141c is obliquely inclined with respect to the frame 130 such that the wiper lip 140c cannot fall out downwardly from the spoiler 120c.

The guide couplers 126c extend from both ends of the spoiler 120c inwardly of the spoiler while forming an acute angle with respect to the horizontal plane. Thus, the frame 130 can be easily fixed to a lower portion of the spoiler 120c and be received therein.

Figure 13:
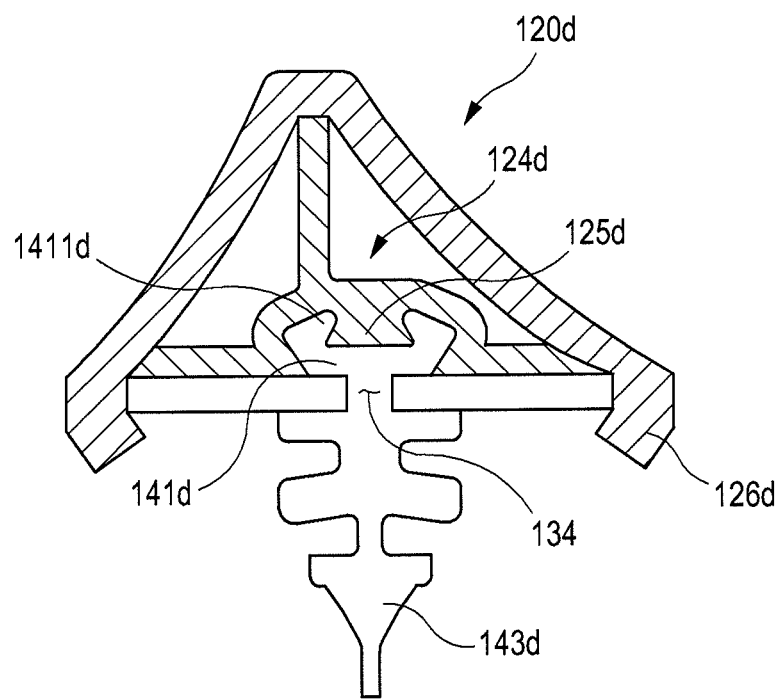

FIG. 13 is a cross-sectional view showing a fourth embodiment of the reinforcing member provided in the spoiler. The reinforcing member 124d shown in FIG. 13 is similar to the reinforcing member shown in FIG. 11. However, they are different in terms of the shapes of the following parts: guide couplers 126d for coupling to the frame 130; a head 141d of the wiper lip 140d; and a head seat 125d.

A U-shaped protrusion 1411d protrudes upwardly from the head 141d of the wiper lip 140d. The head seat 125d, which corresponds to the shape of the head 141d with the protrusion 1411d, is formed at a midway lower end of the reinforcing member 124d. The head 141d of the wiper lip 140d engages and is firmly fixed to the head seat 125d of the reinforcing member 124d. The protrusion 1411d of the head 141d is obliquely inclined with respect to the frame 130 such that the wiper lip 140d cannot fall out downwardly from the spoiler 120d.

The guide couplers 126d extend from either the front end or rear end of the spoiler 120c inwardly of the spoiler while forming an acute angle with respect to the horizontal plane. Thus, the frame 130 can be easily fitted to a lower portion of the spoiler 120d and be received therein.

Figure 14:
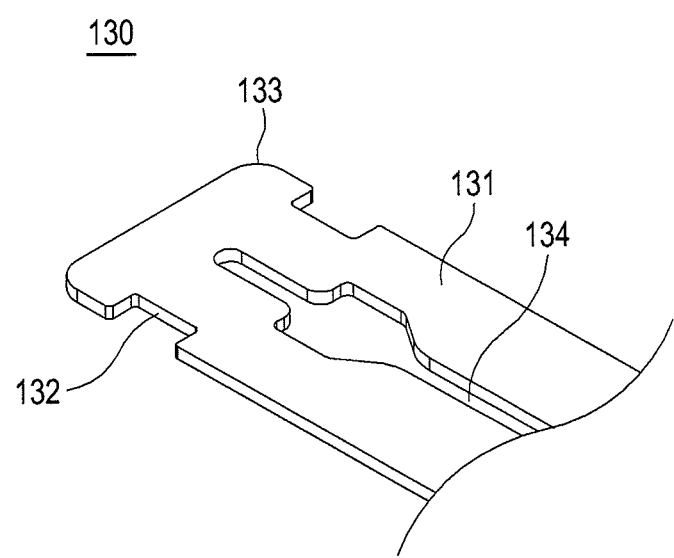
FIG. 14 is a partial perspective view showing an end portion of a frame of the wiper blade according to the present invention.
Figure 15:
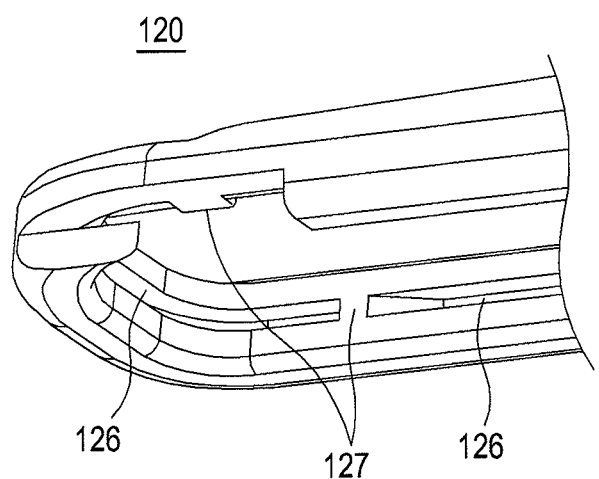
FIG. 15 is a partial perspective view showing an end portion of the spoiler of the wiper blade according to the present invention.

FIG. 14 is a partial perspective view showing an end portion of the frame of the wiper blade according to the present invention. FIG. 15 is a partial perspective view showing an end portion of the spoiler of the wiper blade according to the present invention. FIG. 15 shows an interior of the end portion with a portion of the tip portion cut away.

As shown in FIGS. 14 and 15, in the front and rear ends 131 of the frame 130 at which the frame 130 is seated to the guide 126, a portion of the frame 130 that is at a predetermined distance from the either longitudinal end of the frame 130 is cut out to form locking grooves 132. The spoiler 120 includes locking protrusions 127, which can be fitted to the locking grooves 132 of the frame 130, in the guide 126. The locking protrusions are at a predetermined distance from both ends of the spoiler. The guide 126 of the spoiler 120 covers the longitudinal end of the spoiler 120 such that the longitudinal end of the frame 130 is seated in the guide. Further, the guide 126 extends in the frontward and rearward direction in the tip portion to cover the frame 130. Accordingly, although a tip clamp is not provided separately, the spoiler 120 and the frame 130 are not allowed to move relative to each other in the longitudinal direction.

The spoiler 120 is made from an elastic material such as rubber. If one longitudinal end 133 of the frame 130 is placed in the guide 126 and is pushed toward the end of the spoiler 120, then the end 133 of the frame 130 is caught by the locking protrusion 127 and then stops. Thereafter, a user bends a longitudinal end portion of the spoiler 120 upward and then positions the frame 130 such that the locking protrusions 127 can be mated to the locking grooves 132. The user then allows the longitudinal end portion of the spoiler 120 to revert to its original position such that the end 133 of the frame 130 can be seated in the guide 126. When the locking protrusions 127 of the spoiler 120 are fitted to the locking grooves 132 of the frame 130, the assembly is completed.

Engagement between the locking grooves 132 and the locking protrusions 127 restrains the relatively longitudinal movement between the spoiler 120 and the frame 130. Since the spoiler made from an elastic material, any deformation may separate the frame 130 from the guide 126. However, since the locking protrusions 127 of the spoiler 120 are fitted to the locking grooves 132 of the frame 130, the spoiler 120 and the frame 130 can be firmly coupled to each other. This can restrain, for example, the frame 130 from being moved in the longitudinal direction relative to the guide due to slip in the guide 126. Further, even if a sudden external impact may deform the guide 126, the locking protrusions 127 fitted to the locking grooves 132 can constantly maintain the positions of the spoiler 120 and the frame 130. Furthermore, the engagement can be firmly maintained since the deformed spoiler can revert to its original position by its elasticity.

The present invention described heretofore should not be intended to be limited to the foregoing embodiments and the accompanying drawings. It will be apparent to those of ordinary skill in the art that various alternations, variations and modifications may be made without departing from the scope of the present invention.

The invention claimed is:

1. A wiper blade comprising:
a frame including an adaptor coupler at a midway portion;
a spoiler receiving the frame and provided next to either side of the adaptor coupler, wherein the spoiler forms an upper surface of the wiper blade and has a top surface, a first side surface, and a second side surface, along its longitudinal direction;
a wiper lip extending downwardly from the frame to contact a windshield; and
an adaptor mounted to the adaptor coupler and connecting the frame to a wiper arm,
wherein a width of the top surface of the spoiler connecting the first side surface and the second side surface of the spoiler is maximal near the adaptor coupler and becomes narrower toward a longitudinal end of the spoiler,
wherein the spoiler includes a plurality of reinforcing members provided in the spoiler in a longitudinal direction,
wherein the frame includes a slit formed in a longitudinal direction at a midway portion,
wherein the wiper lip includes a head inserted into the spoiler through the slit and having a width wider than the slit,
wherein the reinforcing members include a head seat having a configuration corresponding to the head of the wiper lip such that the head is seated in the head seat,
wherein the head of the wiper lip includes a protrusion protruding upwardly and the head seat of the reinforcing members include a groove configured to contact the head and the protrusion, and
wherein the protrusion of the head is formed obliquely with respect to the frame.

2. The wiper blade of claim 1, wherein the first side surface has a curved cross-section that is concave inwardly of the spoiler.

3. The wiper blade of claim 1, wherein the second side surface has a curved cross-section that is concave inwardly of the spoiler.

4. The wiper blade of claim 1, wherein the top surface includes a curved surface that is concave with respect to a front of the spoiler.

5. The wiper blade of claim 1, wherein the spoiler includes a pair of guide couplers each formed in a lower front end and a lower rear end of the spoiler, respectively, along the longitudinal direction of the spoiler and extending inwardly, and
wherein the frame is seated in the guide couplers such that the frame is received in the spoiler.

6. The wiper blade of claim 5, wherein the guide couplers extend inwardly of the spoiler from either the first side bottom or the second side bottom of the spoiler while being inclined to form an acute angle with respect to a horizontal plane.

7. The wiper blade of claim 5, wherein the frame includes a locking groove that is cut out at a distance from a longitudinal end of the frame, and
wherein the spoiler includes a locking protrusion that is fitted to the locking groove when assembling the frame and the spoiler.

8. The wiper blade of claim 1, wherein the reinforcing members include a flat plate provided in the spoiler, the flat plate having a shape of the cross-section of the spoiler.

9. The wiper blade of claim 1, wherein the reinforcing members include a reinforcing frame formed on an inner surface of the spoiler.

10. The wiper blade of claim 9, wherein the reinforcing frame includes a vertical reinforcing frame extending downwardly from the top surface of the spoiler and a horizontal reinforcing frame extending from both longitudinal ends of the spoiler toward a center of the spoiler.

* * * * *